United States Patent [19]
Goore

[11] 3,800,035
[45] Mar. 26, 1974

[54] PRODUCTION OF INTERFERON FROM HUMAN LEUKOCYTES IN THE ABSENCE OF SERUM

[75] Inventor: Moshe Goore, Norristown, Pa.

[73] Assignee: Smithkline Corporation, Philadelphia, Pa.

[22] Filed: Dec. 7, 1971

[21] Appl. No.: 205,766

[52] U.S. Cl. ................................................. 424/85
[51] Int. Cl. ............................................ A61k 27/00
[58] Field of Search ...................................... 424/85

[56] References Cited
OTHER PUBLICATIONS

Hudhazy et al., J. Gen. Virol., Vol. 5, pages 351–358, 1969.
Rita, The Interferons, published by Academic Press, New York, 1968, pages 225–226.
Rosztoczy et al., Acta Virol., Vol. 14, pages 398–400, 1970.
Strander, Applied Microbiology, Vol. 18, pages 810–815, 1969.
Paucker et al., Bacteriological Reviews, Vol. 31, page 150, 1967.

Primary Examiner—Richard L. Huff
Attorney, Agent, or Firm—Alan D. Lourie; William H. Edgerton

[57] ABSTRACT

Interferon production from human leukocytes in the absence of serum is achieved by first priming the cells with interferon in the presence of serum, removing the serum, and then incubating the cells with an inducer in a serum-free medium.

7 Claims, No Drawings

PRODUCTION OF INTERFERON FROM HUMAN LEUKOCYTES IN THE ABSENCE OF SERUM

This invention relates to an improvement in a method for producing interferon.

Interferon is a Proteinaceous antiviral substance produced by the cells of many vertebrates as a result of virus infection. Human interferon can be produced in vitro by inducing human leukocytes suspensions with an appropriate inducer, usually a virus. In order to obtain a high yield, it has been considered necessary to have serum present in the medium during the reaction. The interferon resulting from this production in the presence of serum has serious disadvantages. It is crude and therefore not well suited for chemical or physicochemical analysis. Furthermore, the presence of other proteins from the serum which might cause undesirable side effects constitutes a deterrent to the use of the interferon in human treatment. In addition, purification of the interferon in order to eliminate the undesired protein results in a lowering of the final yield of product.

In order to eliminate the problem associated with use of serum in interferon production, attempts have been made to avoid its use. The result has been an insufficiently low yield.

The present invention provides a means for preparing a purer interferon in satisfactory yield without the addition of serum, thereby obtaining a product relatively free of the extraneous protein material from serum. The present process is based on the discovery that, contrary to what was heretofore believed, serum is not necessary throughout the process for the production of interferon. It need be used only in a priming step, but not in the production step. The resulting interferon is then nearly free of extraneous protein.

The present invention thus constitutes an improvement in the method of producing interferon by induction of cells, the improvement consisting of first priming the cells with interferon in the presence of serum, removing the serum, resuspending the cells in a suitable nutrient medium, and then carrying out the incubation for the production of interferon.

The first step in the process involves priming the cells with interferon in the presence of serum. The cells to be used can be any human or animal cells capable of producing interferon. Leukocytes are preferred. They are obtained from blood centers and are utilized within 24 hours of collection. They are freed from erythrocytes by two treatments with ammonium chloride solution according to known procedures. The cells are then suspended in a suitable growth medium containing serum, nutrients, and buffer; an antibiotic such as neomycin may also be added. Interferon is then introduced. The amount of interferon should be sufficient to prime the reaction; this can be 10–200 units, preferably about 50. The serum concentration should be about 2–10 percent, preferably 5%. The cells are then primed by incubation with gentle stirring. The priming time is about 5 minutes to 2 hours, preferably 2 hours.

The serum is then removed by centrifugation and decantation and the cells are resuspended in a prewarmed serum-free medium consisting of a buffered solution which has a pH suitable for physiological use and a nutrient medium which contains substantially all the essential amino acids. An antibiotic may also be present. Examples of the nutrient medium are Eagle's basal essential medium (BME) and minimum essential medium (MEM). Examples of the buffered solution are bicarbonate, phosphate, or tricine. An interferon inducer is then added. The inducer can be any material capable of inducing the particular cells to produce interferon. Such materials include viruses such as parainfluenza virus, Sindbis, and Newcastle disease virus; synthetic materials such as polyinosinic-polycytidylic acid; and natural nucleic acids obtained from fungi, bacteria, and other microorganisms, including double and single-stranded ribonucleic acids and complexes thereof with polysaccharides and other substances. The inducer is then added to a concentration known to the art to be sufficient to induce the particular cells optimally. Incubation then proceeds until production of interferon is maximal, which can be in about 12–25 hours. The cells are then removed by centrifugation and, in order to inactivate the virus, the supernatant is dialyzed against a sodium chloride solution at pH 2 (obtained by the addition of HCl). After 24 hours dialysis the interferon solution is brought back to pH 7 by the addition of NaOH. It can then be used in solution, further purified, or lyophilized.

The kinetics of interferon production by this invention have been found to be essentially identical to those when interferon is produced in the presence of serum. However, the protein content of serum-free interferon was 0.2 mg/ml., compared with 2.9 mg/ml. in interferon produced in the presence of serum. Since the potency of the two preparations is the same, a ten-fold purification has been achieved. The only protein detected by polyacrylamide gel electrophoresis in the serum-free interferon was a small amount of albumin.

The following table indicates the interferon obtained by this invention, the interferon being assayed by the plaque reduction method using a V-amnion system.

INTERFERON UNITS $\times 10^3$

| Time after induction (hours) | No serum throughout | Serum throughout | Serum only during priming |
|---|---|---|---|
| 2 | 100 | 500 | 500 |
| 4 | 1500 | 2000 | 2000 |
| 6 | 1800 | 2000 | 2000 |
| 8 | 2200 | 10000 | 7000 |
| 12 | 4000 | — | 16000 |
| 14 | 1000 | 10000 | 16000 |
| 18 | 1000 | 8000 | 15000 |

The following examples are intended to illustrate the best mode for practicing the process of this invention, but are not to be construed to limit the scope of the invention.

EXAMPLE 1

Four buffy coats obtained from the New York Blood Center were pooled, and to the pooled mixture (100 ml) 800 ml of cold 0.83 percent $NH_4Cl$ are added. After incubation for 10 minutes at 4°C, the suspension is centrifuged at 160 g for 20 minutes. The supernatant is discarded and the pellet is dispersed in 90 ml of BME medium supplemented with 5% human serum, and the $NH_4Cl$ treatment repeated. After the second $NH_4Cl$ treatment the cells are dispersed in a small volume (20 ml) of BME. The cells are counted and their concentration is adjusted to be $10^7$ per ml with BME containing 5% human serum, 25 µg/1 ml neomycin. A hundred units of leukocyte human interferon are added to the cell suspension. The reaction mixture, 200 ml, is incubated at 37°C for 2 hours under gentle stirring. At the end of the priming process the medium is removed by centrifugation at 150 g for 20 minutes. The cell pellet is dispersed in serum free BME medium containing either 0.05 M tricine at pH 7.4 or or 0.01 M sodium phosphate buffer at pH 7.2. Cells are then induced by the addition of parainfluenza 1 (Sendai) virus by the addition of 300 HA units per ml reaction mixture. The cells are kept in suspension by stirring them gently with a magnetic stirrer. After incubation period of 14-18 hours the cells and debris are removed by centrifugation at 5,000-10,000 RPM. The supernatant containing the interferon is dialyzed for 2 days at 4°C against 4 l of 0.05 M NaCl at pH 2. At the end of the dialysis the interferon solution is adjusted back to pH 7.2 by the addition of NaOH. Sodium phosphate buffer at pH 7.2 is added to a final concentration of 0.01 M.

EXAMPLE 2

The process of Example 1 was carried out, except that the leukocytes were prepared from whole blood by the dextran method. 5% Dextran 250 (100 ml.) was added to 400 ml. of blood. The mixture was incubated for 45 minutes at 37°C for phase separation. At the end of the incubation period, the upper phase (250 ml.) was decanted off and the lower phase was collected. The leukocytes were separated by centrifugation at 150 g. Erythrocytes were removed by $NH_4Cl$ treatment as in Example 1.

I claim:

1. In the method of producing interferon which consists of inducing with an interferon inducer human leukocyte cells capable of producing interferon, the improvement comprising first pretreating the cells in the presence of serum with a priming-effective amount of from 10 to 200 units of interferon for 5 minutes to 2 hours, separating the cells from the serum-containing medium, and thereafter incubating the cells in serum-free Eagles basal essential medium or minimum essential medium buffered to a physiological pH containing an inducer capable of inducing said leukocytes to produce interferon for a sufficient period of time to produce a desired amount of interferon.

2. The improvement as claimed in claim 1, in which the inducer is Newcastle disease virus.

3. The improvement as claimed in claim 1, in which the inducer is parainfluenza virus.

4. The improvement as claimed in claim 3, in which the concentration of serum in the priming step is 2-10%.

5. The improvement as claimed in claim 4, in which the nutrient medium is Eagle's basal essential medium or minimal essential medium, and the buffer is bicarbonate, phosphate, or tricine.

6. The improvement as claimed in claim 5, in which the virus is parainfluenza virus, Sendai strain.

7. The improvement as claimed in claim 6, in which, 100 units of interferon are used in the priming step, the buffer is 0.05 M tricine at pH 7.4 or 0.01 M sodium phosphate at pH 7.2, and the amount of parainfluenza virus is 300 HA units per ml.

* * * * *